March 23, 1954     W. S. OLIWA     2,673,320
MOTOR SPEED CONTROL UNIT
Filed April 25, 1951
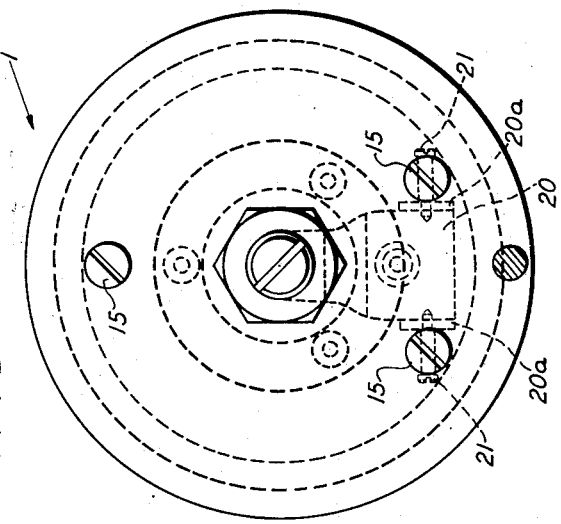
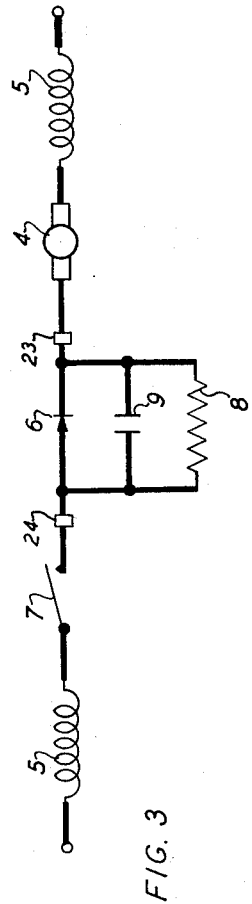
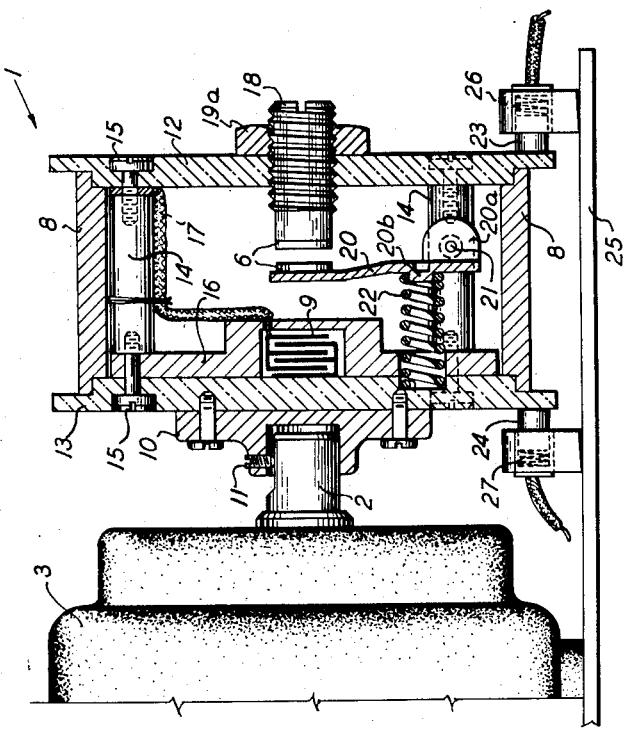
INVENTOR
WALTER S. OLIWA
ATTORNEY Patented Mar. 23, 1954

2,673,320

UNITED STATES PATENT OFFICE 2,673,320

MOTOR SPEED CONTROL UNIT

Walter S. Oliwa, Orange, N. J., assignor to Monroe Calculating Machine Company, Orange, N. J., a corporation of Delaware Application April 25, 1951, Serial No. 222,829

3 Claims. (Cl. 318—325)

1

This invention relates to motor speed regulators particularly suitable for small motors of the universal or series type.

Motor regulators or governors for these motors are well known in the art. One type of regulator on which this invention is an improvement, consists of placing a set of contacts in the motor circuit, the opening and closing of these contacts being controlled by centrifugal force resulting from the speed of the motor. In such a regulator the contacts are adjusted so that they will open at any desired speed, thus opening the motor circuit. When the speed falls below the desired value, the contacts close, thus closing the motor circuit until the motor is brought back to speed. A capacitor and a resistor are usually connected in parallel with the contacts to reduce arcing.

A disadvantage of the resistor and capacitor arrangements heretofore used is that the resistor and capacitor are both relatively large in size and occupy considerable room on the motor mounting.

Another disadvantage is that the resistors heat up to quite a high temperature.

Still another disadvantage is that the leads from the contacts to the resistors and capacitors act as aerials for radiating radio frequency waves produced by the interruption of the current when the contacts are opened and closed.

It is an object of this invention to produce an improved motor speed regulator which is not only compact in size but which overcomes or minimizes the foregoing and other disadvantages of present day motor control units. In accordance with this invention, the temperature of the unit is decreased by having the resistor as part of the motor speed regulator unit and the radio frequency radiation is reduced by having the condenser also mounted on the motor speed regulator unit, thus eliminating the need for any external leads for the arc reducing elements and circuits used with the contacts.

The novel features, objects, and advantages of this invention will be apparent from the following description, when read with the accompanying in which:

Fig. 1 is a sectional view of the motor speed regulator;

Fig. 2 is an end view of the motor speed regulator;

Fig. 3 is a schematic diagram of the electric circuit employed by this invention.

In general, the regulator comprises a unit 1 preferably mounted upon the end of the shaft 2 of a motor such as a series motor 3 having an armature 4 and field coils 5. The unit controls a pair of contacts 6 which are in series with the line switch 7, the field, and the armature of the motor.

In order to prevent arcing, a resistor 8 and a condenser 9 are connected in parallel with the motor contacts 6, which, as stated, are in series with the line switch, field coil, and armature of the electric motor as shown in Fig. 3.

As shown in Fig. 1 the motor regulator 1 constructed according to this invention is mounted on the shaft 2 of series motor 3 by means of a coupling plate 10 which fits over the shaft and is held thereon by one or more set screws 11.

The motor control unit 1 consists of two copper disks 12 and 13, arranged perpendicular to the shaft and held together in spaced relation by three insulating binding posts 14 to which the disks are held by screws 15. Disks 12 and 13 preferably have a portion of their circumferences turned down to provide shoulders for receiving the resistor 8. Resistor 8 is preferably made of a plastic material as specified in Electrical Manufacturing, November 1949, page 60, "Plastics can be electrical conductors," and is in the nature of a sleeve of the desired size and shape to fit between the spaced disks 12 and 13 and be gripped between the shoulders thereof. Preferably the resistor is formed slightly larger than the length of the binding posts to insure good electrical contact. The resistor thus serves to space the disks 12 and 13 and in so doing makes electrical contact with the disks. The resistor on the other hand may be of the conventional wire wound type where the body portion is of any conventional insulating material of shape and size to fit between the disks and where the wire resistance element is wound on the exterior portion of the insulating material. Furthermore, if the latter construction is utilized, screws 15 could be threaded directly into the body portion of the resistor and the posts 14 omitted.

In order to reduce the external leads to a minimum the condenser 9 is also mounted on the motor control unit. The condenser is preferably of the titanium oxide type, is arranged with one end plate in contact with disk 13 with its center line coincident with the center line of the motor control unit thus eliminating any balancing requirement, and is held in place by a cap 16 of insulating material. Lead 17 connects the other end plate of condenser 9 to the other disk 12. Therefore, condenser 9 is connected across the disks 12 and 13 by the use of only one short lead.

The motor control contacts 6 are also mounted in the motor control unit, one of them being mounted upon the end of an adjusting screw 18 threaded into disk 12 coaxial with the motor shaft and lockable in adjusted position by a lock nut 19a. The other contact 6 which is the centrifugally controlled contact of the pair is carried upon an arm 20 pivotally mounted between two of the binding posts 14. For this purpose the arm 20 has its opposite ends provided with two ear portions 20a to receive pivots 21 threaded into the posts 14. As a result, the pivoted contact 6 has freedom of rocking movement axially with said motor control unit but is secured from movement in any other relative direction. Arm 20 is also provided with an embossed portion 20b which is adapted to hold one end of a compression spring 22. The other end of spring 22 is inserted into a hole in cap 16 and into a recess portion of disk 13. Spring 22 thus serves to urge the two contacts 6 into engagement at all times. When the motor reaches the desired speed as determined in part by the position of screw 18, the centrifugal force will overcome the tension of spring 22 and separate the contacts 6 which opens the circuit to the motor. When the motor speed is reduced sufficiently after the motor circuit is opened, the spring 22 will again close the contacts 6 to again bring or maintain the motor speed up to or at the predetermined speed. Spring 22 also acts as the electric conductor between the pivoted contact 6 through contact arm 20 to the copper disk 13.

It can therefore be seen that the pivoted contact 6, one plate of condenser 9, and one end of resistor 8 are connected to disk 13. The adjustable contact 6, the other plate of condenser 9, through lead 17, and the other end of resistor 8 are connected to copper disk 12. Therefore, these three elements are connected in parallel with one another.

In order to provide external connections to the regulator, brushes 23 and 24 are provided. Brushes 23 and 24 are held in insulating brackets secured to the motor base plate 25 and contact the copper disks 12 and 13 respectively. The brushes are held in contact with the copper disks by means of springs 26 and 27 in the usual manner or by any other well known means used in conventional brush construction. The leads from the brushes 26 and 27 are connected in series with the other elements of the motor control circuit as shown in Fig. 3.

As was previously mentioned, the resistors of the present motor control units heat up due to wattage consumption. As the resistor of the present construction is part of the control unit it, therefore, rotates with the unit. As a result, it can be seen that the resistor will be cooled off at a greater rate than a stationary resistor due to the dissipation of heat to the air during rotation and due to its direct conductive contact with the copper disks. If further reduction in heat is desired, copper disks 12 and 13 may have fins formed on their surfaces to act both as heat dissipators and as fans to produce air circulation through the inner section of the motor control unit and the resistor. The exterior surface can also be formed into scallops to increase surface area, therefore causing more air disturbance to increase heat dissipation.

The resistor and condenser in the construction shown are connected across the contacts 6 with no leads except the very short lead 17 which is used to connect the one plate of condenser 9 to the copper disk 12. As a result, it can be seen that any aerial effects for the R. F. frequencies due to leads are minimized, if not eliminated.

Because the resistor and capacitor are mounted on the motor control unit itself, no room or space must be provided for these elements.

Other inherent advantages will be apparent to those skilled in the art to whom it will also be apparent that minor deviations may be made from the embodiment shown without departing from the spirit and scope of this invention as claimed.

With the above disclosed description and objectives, I claim:

1. A motor speed control unit including a first conductive disc fixed concentrically on the motor shaft, a second conductive disc, an annulus of resistive material connecting the two discs electrically and mechanically and therewith forming a cylinder, centrifugal contacts mounted within said cylinder for connecting said discs electrically, a condenser electrically connecting both discs, and a supply line for the motor including brushes contacting said discs.

2. A motor speed control unit including a first conductive disc fixed concentrically on the motor shaft, a second conductive disc, a plurality of non-conducting binding posts securing the second disc in parallel spaced relation to the first, an annulus of resistive material connecting said discs electrically and mechanically and therewith forming a cylinder, a condenser secured to one of said discs by said binding posts and electrically connected to both discs, said condenser being located within said cylinder, centrifugally operable contacts located within the cylinder and electrically connected with both discs, and a supply line for the motor including brushes contacting said discs.

3. The combination according to claim 2 wherein said centrifugally operable contacts include an adjustment screw threaded through one of said discs at its center and having a contact face on the end internally of the cylinder, a contact arm pivoted between a pair of said binding posts and adapted to contact said contact face, and a spring bearing against the other of said discs and tensioning said contact arm to contact said contact face, said spring also electrically connecting said contact arm with the associated disc.

WALTER S. OLIWA.

References Cited in the file of this patent

UNITED STATES PATENTS

| Number | Name | Date |
|---|---|---|
| 2,274,480 | Jepson | Feb. 24, 1942 |
| 2,442,456 | Boyden | June 1, 1948 |
| 2,488,364 | Zilliotto | Nov. 15, 1949 |